2 Sheets—Sheet 1.
T. G. HALL.
Apparatus for Extracting Metals from Ores.
No. 233,505. Patented Oct. 19, 1880.
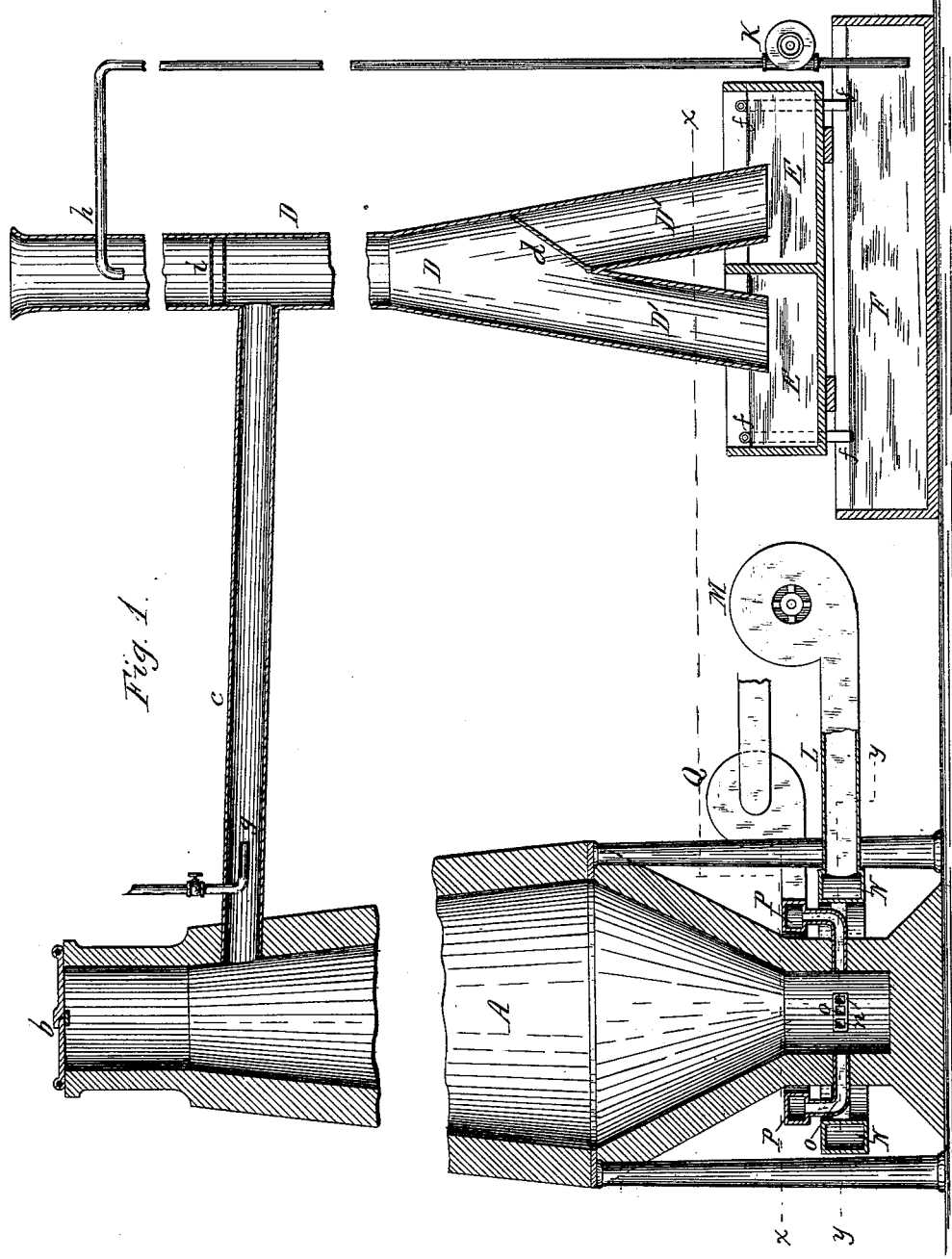

2 Sheets—Sheet 2.
T. G. HALL.
Apparatus for Extracting Metals from Ores.
No. 233,505. Patented Oct. 19, 1880.
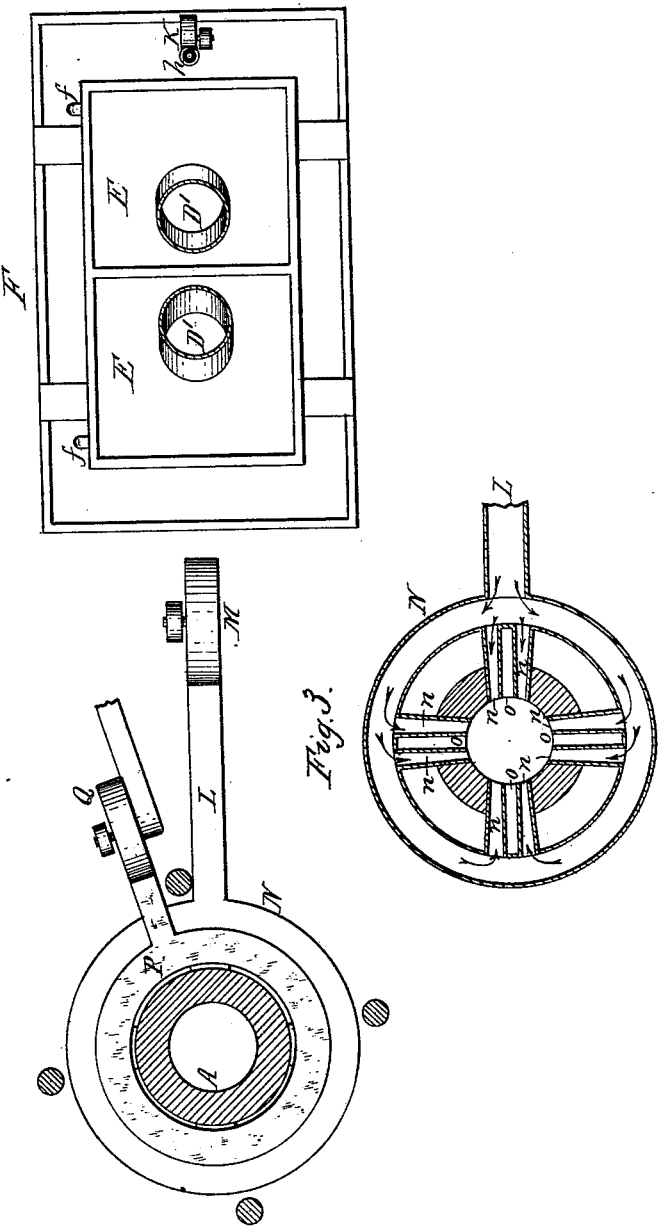

UNITED STATES PATENT OFFICE.

THURSTON G. HALL, OF BUFFALO, NEW YORK, ASSIGNOR OF ONE-HALF OF HIS RIGHT TO GEORGE H. VAN VLECK, OF SAME PLACE.

APPARATUS FOR EXTRACTING METALS FROM ORES.

SPECIFICATION forming part of Letters Patent No. 233,505, dated October 19, 1880.

Application filed November 13, 1879.

*To all whom it may concern:*

Be it known that I, THURSTON G. HALL, of the city of Buffalo, in the county of Erie and State of New York, have invented new and useful Improvements in Apparatus for Extracting Metal from Ore, of which the following is a specification, reference being had to the accompanying drawings.

My invention relates to an improved furnace for extracting metals from ores by heating the ore in the furnace until the metal is sublimated, and then condensing or precipitating the metal in a suitable condensing-chamber.

The object of my invention is more especially to provide an apparatus for extracting the precious metals from auriferous and argentiferous ores; but it may with advantage be employed in furnaces for the reduction of different kinds of ores, more especially ores containing lead.

My invention consists in the particular construction of the apparatus whereby an intense heat is generated in the furnace and the condensation and collection of the sublimated metal are effected very conveniently, as will be hereinafter fully set forth.

In the accompanying drawings, consisting of two sheets, Figure 1 is a sectional elevation of my improved apparatus. Figs. 2 and 3 are horizontal sections in lines $x\ x$ and $y\ y$, Fig. 1, respectively.

Like letters of reference refer to like parts in the several figures.

A represents the blast-furnace in which the ore is smelted, and $b$ the hinged cover thereof, which closes the feed-opening at the top of the furnace, except when material is fed into the furnace. $c$ is a pipe or tube leading from the upper portion of the furnace to a vertical condensing chamber or column, D, through which a shower of water descends. The lower end of the column D terminates in two branch pipes, D', each leading to a separate receptacle or tank, E. $d$ is a valve arranged at the junction of the branch pipes D' with the pipe D, whereby the current of liquid is directed into either of the branches D' at the desire of the operator. By this arrangement of tanks and pipes the sediment can be removed from one tank E while the liquid is discharged into the other tank E.

The ends of the branch pipes D' are preferably arranged below the water-level in the tanks E, so as to be water-sealed. The tanks E are supported above a large tank, F, and provided with overflow-pipes $f$, which discharge the surplus of liquid from the receptacles E into the tank F.

$g$ represents a steam-jet arranged in the pipe $c$, so as to create a draft toward the column D and assist the gases and vapors in passing from the furnace to the column D. $h$ is a water-jet arranged in the upper portion of the column D above the junction of the pipe $c$ therewith, and $i$ are sieves or perforated plates arranged in the column D for breaking up or dividing the stream of water into a shower.

If desired, the water for supplying the jet $h$ may be taken from the lower tank, F, by means of a pump, K, as shown in Fig. 1.

L is the air-tube through which the blast is supplied to the furnace by means of a centrifugal fan, M, or any other suitable blowing-machine. The blast-pipe L connects with a ring or annular air-chamber, N, which surrounds the lower part of the furnace, and from which a suitable number of tuyeres, $n$, lead to the furnace. Each air-tuyere is preferably composed of two parts, which inclose an independent central tuyere, $o$. The latter are fed from an annular chamber, P, by means of a fan or other blowing-machine, Q, with a combustible gas generated in any suitable manner.

The stream of gas is discharged into the furnace from each tuyere $o$ between and in contact with the streams of air issuing from the adjacent tuyeres $n$, and a perfect combustion of the gas is thereby insured and a very high degree of heat is generated thereby.

Two or more rows or tiers of air and gas tuyeres, $n\ o$, may be arranged, one above the other, in the furnace, according to the requirements of the case.

The ore to be treated is placed in the furnace in layers, alternating with layers of solid fuel and flux, in the usual manner. The high degree of heat generated in the furnace sublimates or vaporizes the metal contained in the ore, and the gases and vapor generated in the furnace A pass from the latter, through the pipe c, into the column D, where they meet the descending shower of water. All the constituent parts of the gases and vapors which are capable of being dissolved in water or precipitated by cooling are carried down in the column D by the shower of water and collected as sediment in the tanks E F. This sediment is removed from the tanks and smelted down with lead in crucibles, and the precious metal is finally obtained from the bullion so produced by cupelling or in any other suitable manner.

I have found that by means of my improved apparatus refractory ores can be profitably worked which are not reducible by any known metallurgical process.

I claim as my invention—

1. In combination with the sublimating-furnace A and gas-conduit c, provided with the steam-jet g, the condensing-column D, provided with the water-spray h i, and formed at its lower end with two or more branches, D', gate or valve d, and two or more separate receptacles, E, substantially as and for the purpose set forth.

2. The combination, with the sublimating-furnace A, of the condensing-column D, provided at its lower end with two or more branches, D', gate or valve d, and two or more separate receptacles, E, substantially as set forth.

T. G. HALL.

Witnesses:
JNO. J. BONNER,
EDW. J. BRADY.